(12) United States Patent
Kwak et al.

(10) Patent No.: US 10,715,845 B2
(45) Date of Patent: Jul. 14, 2020

(54) BROADCAST SIGNAL TRANSMISSION/RECEPTION DEVICE AND METHOD

(71) Applicant: LG Electronics Inc., Seoul (KR)

(72) Inventors: Minsung Kwak, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/302,002

(22) PCT Filed: May 24, 2017

(86) PCT No.: PCT/KR2017/005388
§ 371 (c)(1),
(2) Date: Nov. 15, 2018

(87) PCT Pub. No.: WO2017/204546
PCT Pub. Date: Nov. 30, 2017

(65) Prior Publication Data
US 2019/0166390 A1      May 30, 2019

Related U.S. Application Data

(60) Provisional application No. 62/341,099, filed on May 25, 2016, provisional application No. 62/351,889, (Continued)

(51) Int. Cl.
*H04N 21/236* (2011.01)
*H04L 29/08* (2006.01)
(Continued)

(52) U.S. Cl.
CPC ....... *H04N 21/23605* (2013.01); *H04L 67/02* (2013.01); *H04L 69/08* (2013.01);
(Continued)

(58) Field of Classification Search
None
See application file for complete search history.

(56) References Cited

U.S. PATENT DOCUMENTS

2006/0294512 A1* 12/2006 Seiden ............... G06F 8/61
717/168
2008/0057939 A1* 3/2008 Choi-Grogan ........ H04W 68/02
455/425
(Continued)

FOREIGN PATENT DOCUMENTS

KR    10-2007-0043400 A    4/2007
WO      2015-178220 A1    11/2015
(Continued)

*Primary Examiner* — Justin E Shepard
(74) *Attorney, Agent, or Firm* — Dentons US LLP

(57) ABSTRACT

Disclosed is a broadcast signal transmitting method. A broadcast signal transmitting method according to an embodiment of the present invention may comprise: generating low level signaling (LLS) information; processing the LLS information into IP packets; generating link layer packets by link layer processing the IP packets; and generating a broadcast signal by physical layer processing the link layer packets.

12 Claims, 19 Drawing Sheets

Related U.S. Application Data filed on Jun. 17, 2016, provisional application No. 62/360,457, filed on Jul. 10, 2016, provisional application No. 62/404,178, filed on Oct. 4, 2016.

(51) Int. Cl.
  *H04L 29/06* (2006.01)
  *H04N 21/81* (2011.01)
  *H04N 21/858* (2011.01)
  *H04N 21/2187* (2011.01)

(52) U.S. Cl.
  CPC .......... *H04L 69/324* (2013.01); *H04L 69/325* (2013.01); *H04N 21/814* (2013.01); *H04N 21/8586* (2013.01); *H04N 21/2187* (2013.01)

(56) References Cited

U.S. PATENT DOCUMENTS

| | | | |
|---|---|---|---|
| 2010/0107192 A1 | 4/2010 | Sennett et al. | |
| 2012/0030703 A1* | 2/2012 | Strong | H04H 20/59 725/33 |
| 2014/0282704 A1* | 9/2014 | Tumuluru | H04N 21/4882 725/33 |
| 2014/0313973 A1* | 10/2014 | Park | H04L 45/302 370/328 |
| 2016/0286488 A1* | 9/2016 | Simon | H04W 52/0216 |

FOREIGN PATENT DOCUMENTS

| | | |
|---|---|---|
| WO | 2016-010404 A1 | 1/2016 |
| WO | 2016-068564 A1 | 5/2016 |

\* cited by examiner

[Figure 1]
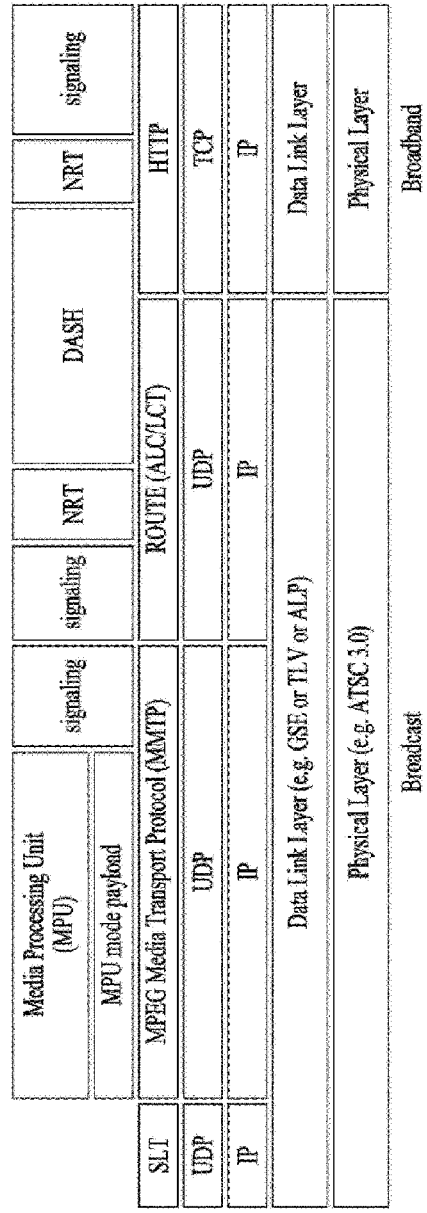

【Figure 2】
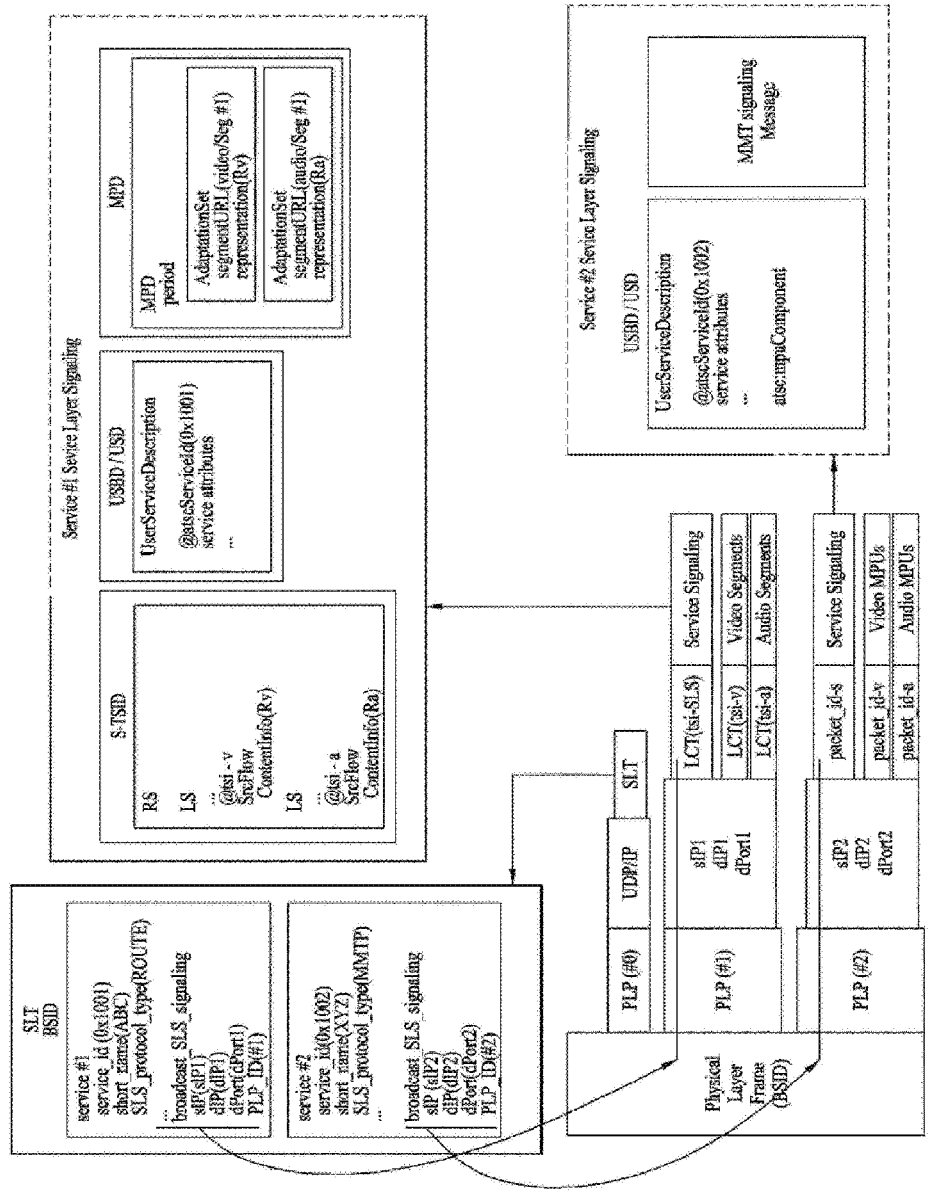

【Figure 3】

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       System Time | var | Sec. 6.4 |
|       break; | | |
|     case 0x04: | | |
|       CAP | var | Sec. 6.5 |
|       break; | | |
|     default: | | |
|       reserved | var | |
|   } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1..999 |
|     @minorChannelNo | 0..1 | 1..999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

[Figure 4]

| Element or Attribute Name | | | | Use | Data Type |
|---|---|---|---|---|---|
| bundleDescription | | | | | |
|   userServiceDescription | | | | | |
| | @globalServiceID | | | 1 | anyURL |
| | @serviceID | | | 1 | unsignedShort |
| | @serviceStatus | | | 0..1 | boolean |
| | @fullMPDUri | | | 1 | anyURL |
| | @sTSIDUri | | | 1 | anyURL |
| | name | | | 0..N | string |
| | | @lang | | 1 | language |
| | serviceLanguage | | | 0..N | language |
| | capabilityCode | | | 0..1 | string |
| | deliveryMethod | | | 1..N | |
| | | broadcastAppService | | 1..N | |
| | | | basePattern | 1..N | string |
| | | unicastAppService | | 0..N | |
| | | | basePattern | 1..N | string |

←— t4010

| Element or Attribute Name | | Use | Data Type |
|---|---|---|---|
| S-TSID | | | |
|   @serviceID | | 1 | unsignedShort |
|   RS | | 1..N | |
| | @bsid | 0..1 | unsignedShort |
| | @slpAddr | 0..1 | string |
| | @dIpAddr | 0..1 | string |
| | @dport | 0..1 | unsignedShort |
| | @PLPID | 0..1 | unsignedByte |
| | LS | 1..N | |
| |   @tsi | 1 | unsignedInt |
| |   @PLPID | 0..1 | unsignedByte |
| |   @bw | 0..1 | unsignedInt |
| |   @startTime | 0..1 | dateTime |
| |   @endTime | 0..1 | dateTime |
| |   SrcFlow | 0..1 | srcFlowType |
| |   RepairFlow | 0..1 | rprFlowType | t4020

[Figure 5]

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

【Figure 6】
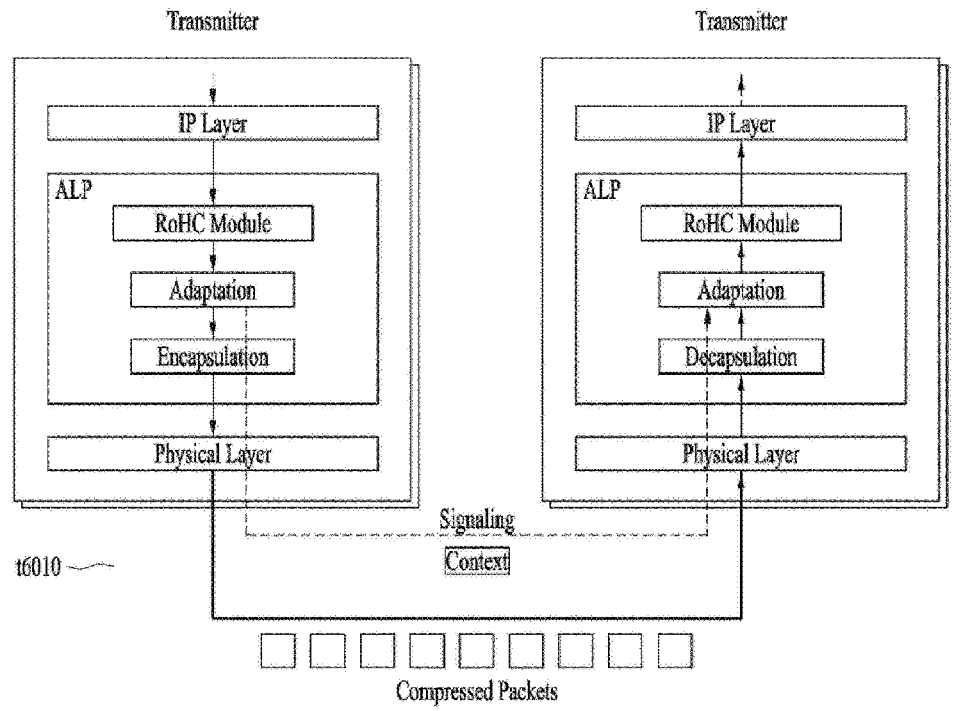
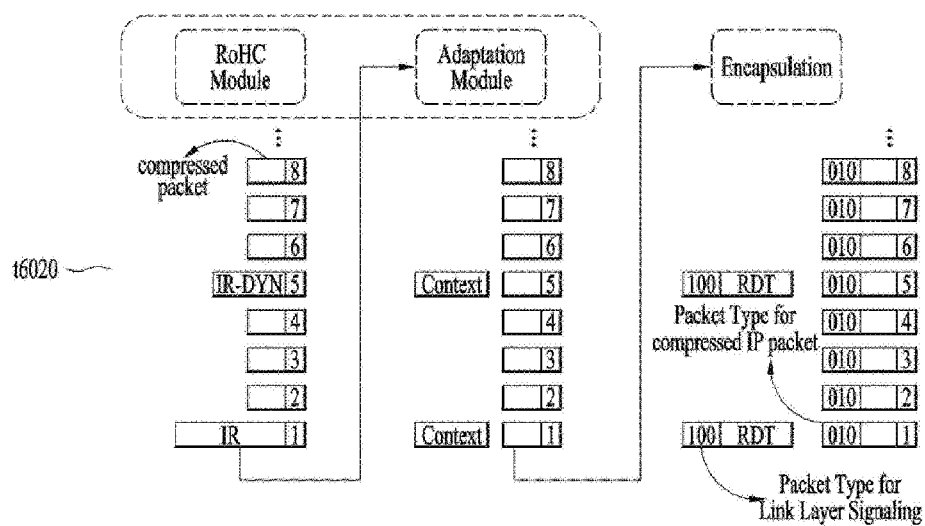

【Figure 7】

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i + +) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if (SID_flag = = "1") { | | |
|             SID | 8 | uimsbf |
|         } | | |
|         if (compressed_flag = = "1') { | | |
|             context_id | 8 | uimsbf |
|         } | | |
|     } | | |
| } | | |

[Figure 8]
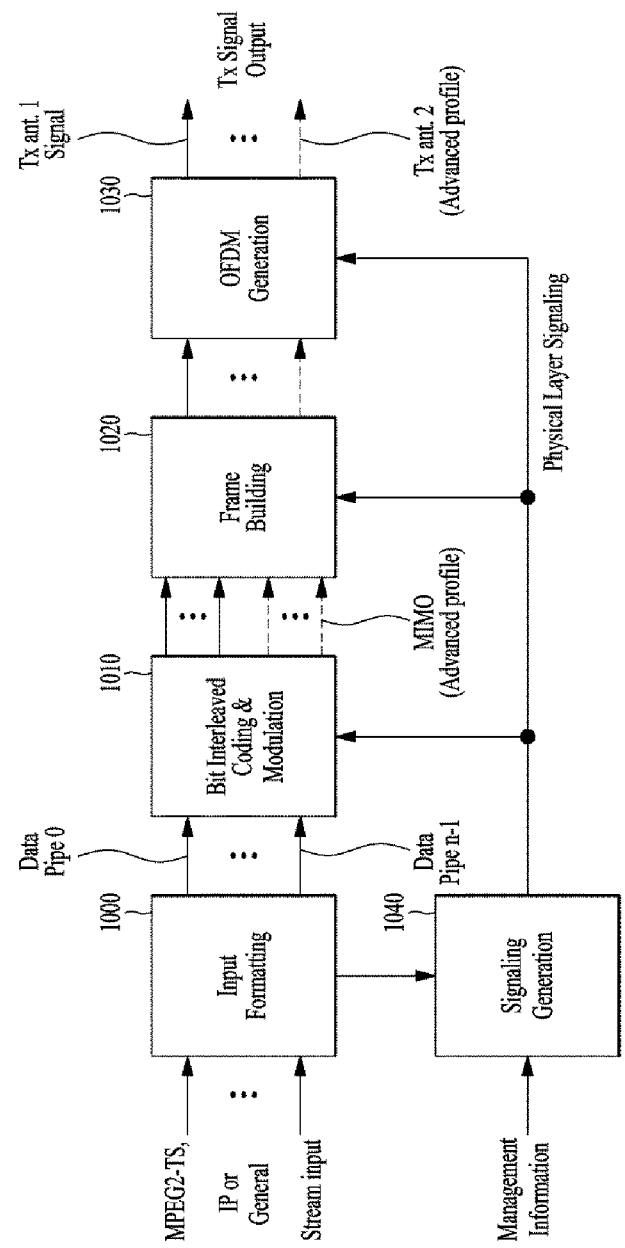

【Figure 9】

【Figure 10】
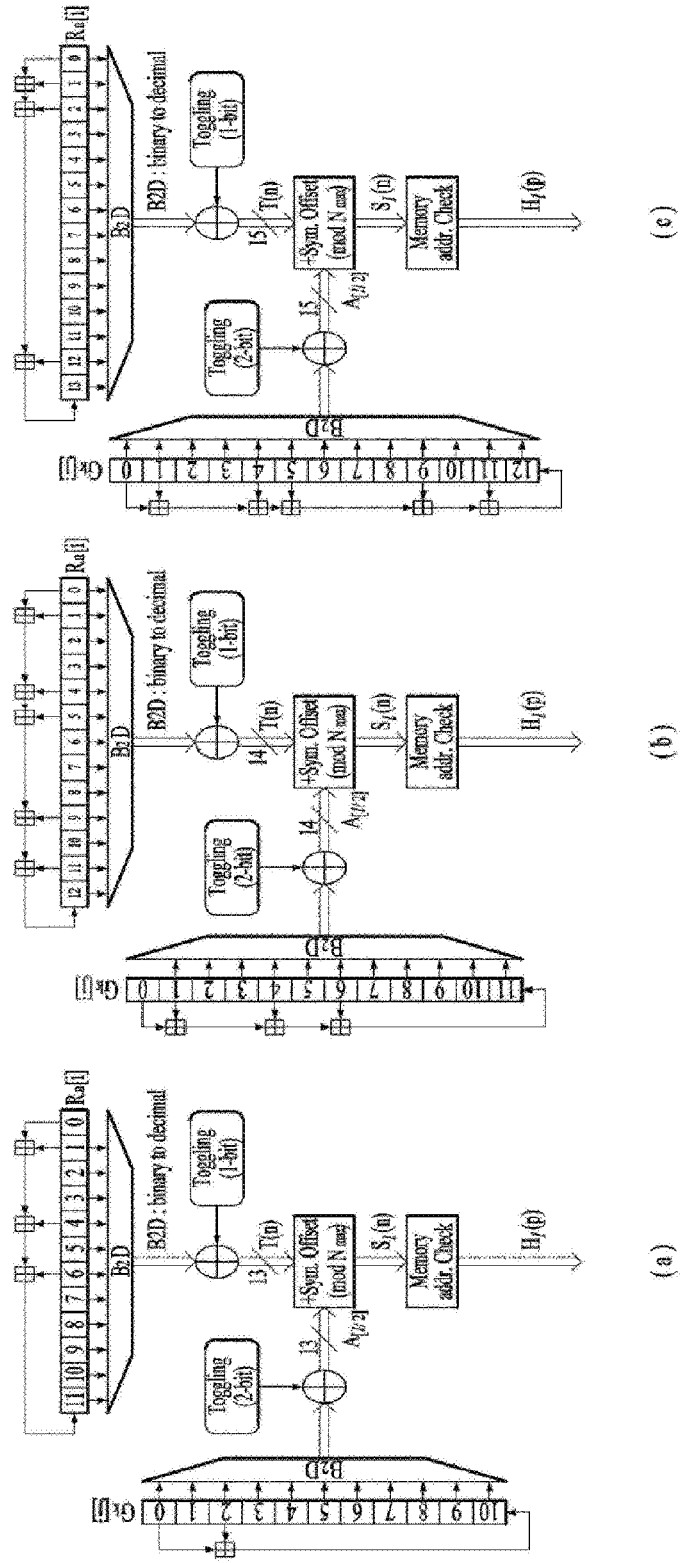

【Figure 11】
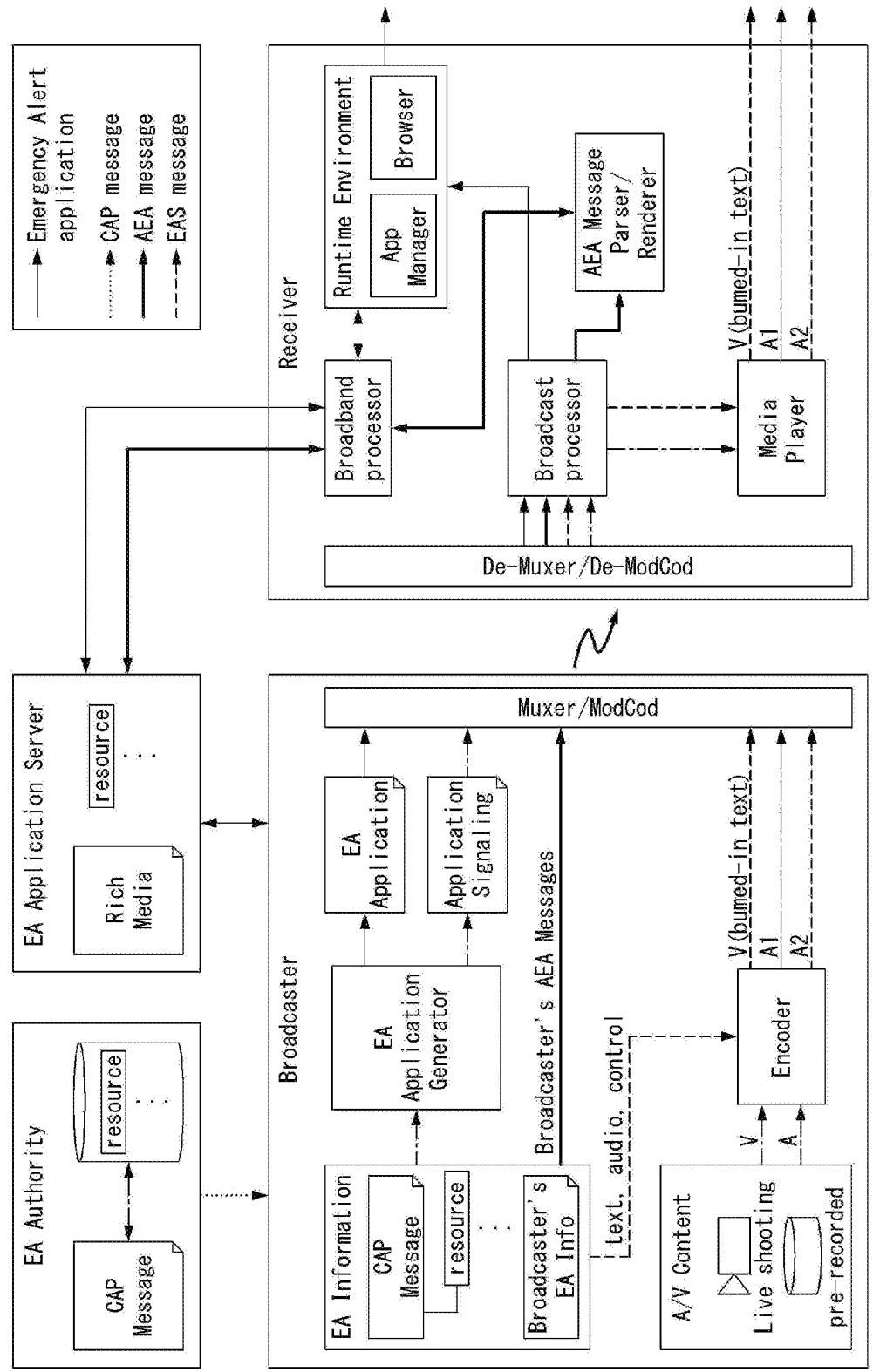

【Figure 12】

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       SystemTime | var | Sec. 6.4 |
|       break; | | |
|     case 0x04: | | |
|       EaMessage | var | Sec. 6.5 |
|       break; | | |
|     default: | | |
|       reserved | var | |
|   } | | |
| } | | |

【Figure 13】

```
<EA_message>
<sequence>
   <EASMessage minOccurs= "0" >
      <AEA-MF minOccurs= "0" > ··· </AEA_MF>
</sequence>
</EA_message>
```

【Figure 14】

```
<EA_message>
<sequence>
    <AEA-MF minOccurs=" 0" >
        ...
        <delay_timer>00:30</delay_timer>
    </AEA-MF>
</sequence>
</EA_message>
```

[Figure 15]

| Syntax | No. of Bits | Format |
|---|---|---|
| LLS_table() { | | |
|   LLS_table_id | 8 | uimsbf |
|   provider_id | 8 | uimsbf |
|   LLS_table_version | 8 | uimsbf |
|   switch (LLS_table_id) | | |
|   { | | |
|     case 0x01: | | |
|       SLT | var | Sec. 6.3 |
|       break; | | |
|     case 0x02: | | |
|       RRT | var | See Annex F |
|       break; | | |
|     case 0x03: | | |
|       SystemTime | var | Sec. 6.4 |
|       break; | | |
|     case 0x04: | | |
|       AEAT | var | Sec. 6.5 |
|       break; | | |
|     case 0x05: | | |
|       KeepClearFlag | var | Sec. 6.6 |
|       break; | | |
|     default: | | |
|       reserved | var | |
|   } | | |
| } | | |

[Figure 16]

| Element or Attribute Name | | | | Use | Data type |
|---|---|---|---|---|---|
| AEAT | | | | | |
| | AEA | | | 1..N | |
| | | @aeaId | | 1 | string |
| | | @audience | | 0..1 | string |
| | | @aeaType | | 0..1 | string |
| | | @referenceAeaId | | 0..1 | string |
| | | @priority | | 1 | unsignedByte |
| | | @delayTimer | | 0..1 | string |
| | | Header | | 1 | |
| | | | @effective | 1 | dateTime |
| | | | @expires | 1 | dateTime |
| | | | EventCode | 1 | string |
| | | | @type | 0..1 | string |
| | | | Location | 1..N | string |
| | | | @type | 1 | string |
| | | AeaText | | 1..N | string |
| | | | @lang | 1 | Language |
| | | Media | | 0..N | |
| | | | @lang | 0..1 | Language |
| | | | @mediaUri | 1 | anyURI |
| | | | MediaDesc | 0..1 | string |
| | | | @lang | 0..1 | Language |
| | | | MediaDerefUri | 0..1 | string |
| | | Signature | | 0..1 | any |

[Figure 17]

| Element or Attribute Name | | Use | Data type |
|---|---|---|---|
| KeepClearFlag | | | |
| | @bsid | 1 | unsignedShort |
| | @flag | 0..1 | Boolean |
| | @serviceId | 0..1 | List of unsignedShort |
| | @serviceIdRange | 0..1 | unsignedByte |
| | @version | 1 | unsignedByte |

[Figure 18]

| Element or Attribute Name | | | | Use | Data Type |
|---|---|---|---|---|---|
| AEAT | | | | | |
| | AEA | | | 1..N | |
| | | @AEAid | | 1 | String |
| | | @Issuer | | 1 | String |
| | | @audience | | 0..1 | String |
| | | @AEAtype | | 0..1 | String |
| | | @refAEAid | | 0..1 | String |
| | | @priority | | 1 | unsignedByte |
| | | @delayTimer | | 0..1 | Duration |
| | | PreferredTuning | | 0..1 | |
| | | | @bsid | 1 | unsignedShort |
| | | | @majorChannelNo | 1 | 1..999 |
| | | | @minorChannelNo | 1 | 1..999 |
| | | | @serviceId | 1 | unsignedShort |
| | | Header | | 1 | |
| | | | @effective | 1 | dateTime |
| | | | @expires | 1 | dateTime |
| | | | EventCode | 1 | String |
| | | | @type | 0..1 | String |
| | | | Location | 1..N | String |
| | | | @type | 1 | String |
| | | AEAtext | | 1..N | String |
| | | | @lang | 1 | Language |
| | | Media | | 0..N | |
| | | | @lang | 0..1 | Language |
| | | | @mediaDesc | 0..1 | String |
| | | | @uri | 1 | anyURI |
| | | | @derefUri | 0..1 | String |
| | | Signature | | 0..1 | String |

[Figure 19]

| Element or Attribute Name | | | | Use | Data Type |
|---|---|---|---|---|---|
| AEAT | | | | | |
| | AEA | | | 1..N | |
| | | @AEAid | | 1 | String |
| | | @issuer | | 1 | String |
| | | @audience | | 1 | String |
| | | @AEAtype | | 1 | String |
| | | @refAEAid | | 0..1 | String |
| | | @priority | | 1 | unsignedByte |
| | | Header | | 1 | |
| | | | @effective | 1 | dateTime |
| | | | @expires | 1 | dateTime |
| | | | EventCode | 0..1 | String |
| | | | @type | 1 | String |
| | | | EventDesc | 0..N | String |
| | | | @lang | 1 | String |
| | | | Location | 1..N | String |
| | | | @type | 1 | String |
| | | AEAtext | | 1..N | String |
| | | | @lang | 1 | String |
| | | LiveMedia | | 0..1 | |
| | | | @bsid | 1 | unsignedShort |
| | | | @serviceId | 1 | unsignedShort |
| | | | ServiceName | 0..N | String |
| | | | @lang | 1 | String |
| | | Media | | 0..N | |
| | | | @lang | 0..1 | String |
| | | | @bannerAudioFlag | 0..1 | Boolean |
| | | | @mediaDesc | 0..1 | String |
| | | | @url | 1 | anyURI |
| | | | @contentType | 0..1 | String |
| | | | @contentLength | 0..1 | unsignedLong |
| | | | @mediaAssoc | 0..1 | anyURI |
| | | Signature | | 0..1 | Any |

[Figure 20]
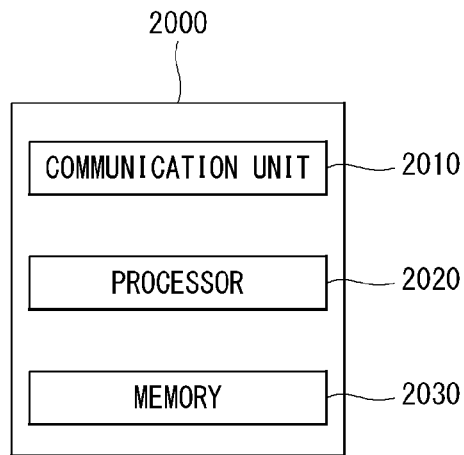
[Figure 21]
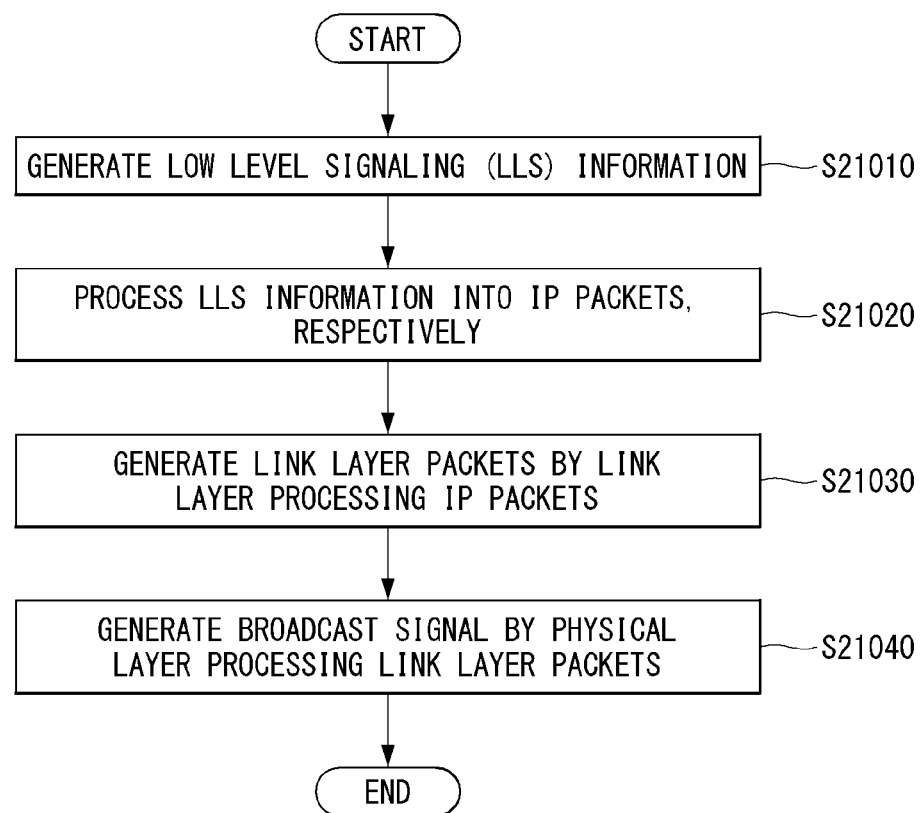

BROADCAST SIGNAL TRANSMISSION/RECEPTION DEVICE AND METHOD

CROSS-REFERENCE TO RELATED APPLICATIONS

This application is the National Stage filing under 35 U.S.C. 371 of International Application No. PCT/KR2017/005388, filed on May 24, 2017, which claims the benefit of U.S. Provisional Application No. 62/341,099, filed on May 25, 2016, U.S. Provisional Application No. 62/351,889, filed on Jun. 17, 2016, and U.S. Provisional Application No. 62/360,457, filed on Jul. 10, 2016, U.S. Provisional Application No. 62/404,178, filed on Oct. 4, 2016, the contents of which are all hereby incorporated by reference herein in their entirety.

TECHNICAL FIELD

The present invention relates to a broadcast signal transmitting apparatus, a broadcast signal receiving apparatus, a broadcast signal transmitting method, and a broadcast signal receiving method.

BACKGROUND ART

Various techniques for transmitting and receiving digital broadcasting signals have been developed as transmission of analog broadcasting signals is terminated. The digital broadcast signal may include a larger amount of video/audio data than the analog broadcast signal and may further include various kinds of additional data as well as video/audio data.

DISCLOSURE

Technical Problem

A digital broadcast system can provide high definition (HD) images, multi-channel audio, and various additional services. However, for digital broadcasting, data transmission efficiency for transmission of a large amount of data, robustness of a transmission/reception network, and network flexibility considering a mobile reception device should be enhanced.

Technical Solution

In order to achieve the technical objects, the present invention proposes a broadcast signal transmitting method and a broadcast signal transmitting apparatus.

A broadcast signal transmitting method according to an embodiment of the present invention includes: generating low level signaling (LLS) information, wherein the LLS information includes type ID information for identifying a type of the LLS information; processing the LLS information into IP packets; generating link layer packets by link layer processing the IP packets; and generating a broadcast signal by physical layer processing the link layer packets, in which the LLS information may include emergency alert (EA) information according to the type ID information, the emergency alert information may include at least one alert message, and the alert message may include priority information indicating a priority of an alert.

As the embodiment, the alert message may include at least one media information and the media information may include media associated information indicating a URI of another media information associated with the media information.

As the embodiment, the media information may further include URI information for identifying the media file and media description information for describing contents of the media file.

As the embodiment, the alert message may include at least one live media information and the live media information includes BSID information for identifying a broadcast stream including an emergency-related A/V service and service ID information for identifying the emergency-related A/V service.

As the embodiment, the live media information may further include service name information and the service name information may include language information indicating a language of a text described in the service name information.

As the embodiment, the alert message may include header information, and the header information may include effective time information for indicating a effective time of the alert message, expiration time information for indicating an expiration time of the alert message, event type information for identifying an event type of the alert message, event description information for providing text description of the alert message, or location information for indicating a target area of the alert message.

As the embodiment, in the processing of the LLS information into the IP packets, the LLS information may be processed into IP packets having well-known IP addresses.

A broadcast signal transmitter according to an embodiment of the present invention includes: a communication unit transmitting a broadcast signal; a memory storing data; and a processor controlling the communication unit and the memory, in which the broadcast signal transmitter is configured to generate low level signaling (LLS) information, wherein the LLS information may include type ID information for identifying a type of the LLS information, process the LLS information into IP packets, generate link layer packets by link layer processing the IP packets, and generate the broadcast signal by physical layer processing the link layer packets, and the LLS information may include emergency alert (EA) information according to the type ID information, the emergency alert information includes at least one alert message, and the alert message includes priority information indicating a priority of an alert.

Advantageous Effects

The present invention can provide various broadcast services by processing data according to service characteristics and controlling quality of service (QoS) for each service or service component.

The present invention can achieve transmission flexibility by transmitting various broadcast services through the same radio frequency (RF) signal bandwidth.

According to the present invention, it is possible to provide broadcasting signal transmitting and receiving methods and broadcast signal transmitting and receiving apparatuses capable of receiving a digital broadcast signal without an error even when using a mobile receiving apparatus or in an indoor environment.

The present invention can effectively support a next generation broadcast service in an environment supporting a next generation hybrid broadcast using a terrestrial broadcasting network and an Internet network.

Hereinafter, additional advantages of the present invention can be described together with a constitution of the invention.

DESCRIPTION OF DRAWINGS

FIG. 1 is a diagram showing a protocol stack according to an embodiment of the present invention.

FIG. 2 is a diagram showing a service discovery procedure according to one embodiment of the present invention.

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 8 illustrates a configuration of a broadcast signal transmission apparatus for future broadcast services according to an embodiment of the present invention.

FIG. 9 illustrates a write operation of a time interleaver according to an embodiment of the present invention.

FIG. 10 illustrates an interleaving address generator including a main pseudo-random binary sequence (PRBS) generator and a sub-PRBS generator according to each FFT mode which are included in a frequency interleaver according to an embodiment of the present invention.

FIG. 11 illustrates an EA system according to an embodiment of the present invention.

FIG. 12 illustrates an LLS table according to another embodiment of the present invention.

FIG. 13 illustrates a method for signaling an EAS message using EAS flag information according to an embodiment of the present invention.

FIG. 14 illustrates an EAS signaling method using delay timer information according to an embodiment of the present invention.

FIG. 14 illustrates a method for transmitting EA information using a UDP/IP according to an embodiment of the present invention.

FIG. 15 illustrates an LLS table according to yet another embodiment of the present invention.

FIG. 16 illustrates AEAT information according to an embodiment of the present invention.

FIG. 17 illustrates KCF information according to an embodiment of the present invention.

FIG. 18 illustrates AEAT information according to another embodiment of the present invention.

FIG. 19 illustrates AEAT information according to yet another embodiment of the present invention.

FIG. 20 illustrates a configuration of a broadcast signal transmitter/receiver according to an embodiment of the present invention.

FIG. 21 illustrates a broadcast signal transmitting method according to an embodiment of the present invention.

BEST MODE

In what follows, preferred embodiments of the present invention are described in detail with reference to appended drawings. Detailed descriptions with reference to appended drawings are not necessarily limited only to the embodiments which may be implemented according to the present invention but rather intended to describe preferred embodiments of the present invention. The following descriptions given below include specific details for a thorough understanding of the present invention. However, it should be clearly understood by those skilled in the art that the present invention may be implemented without involving the specific details.

Most of the terms used in the present invention have been chosen among those terms widely accepted in the corresponding field. However, some of the terms are selected arbitrarily by the applicant and their meaning will be described in detail in the following descriptions if needed. Therefore, the present invention should be understood not by the apparent names or immediate meanings of the terms but by the intended meanings of the terms.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @slpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @slpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID.

This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmt- PackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service—IP information—context—PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side.

Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later. The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interlaever according to an embodiment of the present invention can be positioned between a BICM chain block and a frame builder.

Here, the time interlaever according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_{1,i}$ and $e_{2,i}$) corresponding to a pair of constellation mapper outputs is fed to an input of a MIMO encoder and paired MIMO encoder output (g1,i and g2,i) is transmitted by the same carrier k and OFDM symbol I of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group. The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data can include FIC flag information. FIC (fast information channel) is a dedicated channel for carrying cross-layer information to enable fast service acquisition and channel scanning. FIC_FLAG is a 1-bit field and indicates whether the FIC is used in a current frame. If this field is set to '1', the FIC is provided in the current frame. If this field set to '0', the FIC is not carried in the current frame. The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS 1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module. The frame parsing module, the demapping & decoding module and the output processor may execute functions thereof using data output from the signaling decoding module.

According to an embodiment of the present invention, each TI group is either mapped directly to one frame or spread over Pi frames. Each TI group is also divided into more than one TI block ($NT_{TI}$), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, $N_r$, cells are read out. Moreover, in order to achieve single-memory deinterleaving at a receiver side regardless of a number of XFECBLOCKs in a TI block the twisted row-column block interleaver may insert the virtual XFEC-BLOCKs into the TI memory. The virtual XFECBLOCKs must be inserted in front of other FECBLOCKS to achieve single-memory deinterleaving at a receiver side.

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,l}$ is defined as $O_{m,l}=[x_{m,l,o}, \ldots, x_{m,l,p}, \ldots, x_{m,l,Ndata-1}]$ for $l=0, \ldots, N_{sym}-1$, where $x_{m,l,p}$ is the $p^{th}$ cell of the $l^{th}$ OFDM symbol in the $m^{th}$ frame and $N_{data}$ is the number of data cells: $N_{data}$=CFSS for the frame signaling symbol(s), $N_{data}=C_{data}$ for the normal data, and $N_{data}=C_{FES}$ for the frame edge symbol. In addition, the interleaved data cells are defined as $P_{m,l}=[v_{m,l,o}, \ldots, v_{m,l,Ndata-1}]$ for $l=0, \ldots, N_{sym}-1$.

For the OFDM symbol pair, the interleaved OFDM symbol pair is given by $v_{m,l,Hi(p)}=x_{m,l,p}$, $p=0, \ldots, N_{data}-1$, for the first OFDM symbol of each pair $v_{m,l,p}=x_{m,l,Hi(p)}$, $p=0, \ldots, N_{data}-1$ for the second OFDM symbol of each pair, where $H_l(p)$ is the interleaving address generated based on a PRBS generator and a cyclic shift value (symbol offset) of a sub-PRBS generator.

Hereinafter, a structure of an emergency alert system for providing a concept of an emergency alert (EA) and the emergency alert according to an embodiment of the present invention will be described.

In the event of an emergency that needs to issue the emergency alert (EA) over a broadcast network, a broadcast needs to transfer emergency information to a broadcast receiver (e.g., a TV receiver). As the emergency information, various types of information for notifying that the emergency occurs may be provided. For example, a type of emergency information may include at least one of an EA wakeup bit, an open EA message, a closed EA message, an EA application (EAA), a rich media file, and an EA related programming. In the present specification, the emergency information may be referred to as EA information, emergency alert information, or the like.

Even when the broadcast receiver is in a standby mode, the EA wakeup bit/information may be bit/information that allows a viewer to recognize that the emergency occurs. As an example, the EA wakeup bit may be information of 2 bits included in a bootstrap of a physical layer frame (signal frame).

When the broadcast receiver capable of supporting a wakeup function is activated to decode or not to display a picture, the broadcast receiver may monitor an RF signal and check PHY bootstrap signaling for the EA wakeup bit. When the EA wakeup bit in the bootstrap indicates a new or updated emergency, the broadcast receiver may be woken up and process the EA information.

The open EA message may be an open or burned-in message burned and provided to an audio and/or video of a broadcast service. Such an open EA message may have a priority on a screen.

As an example, the open EA message may be generally an emergency alert system (EAS) message broadcasted while being burned-in to the audio and the video of the broadcast service. In this case, each EAS message burned to the audio/video may start with an audio tone for notifying the presence thereof. Followed by text overlaid on the video, such as a static or scroll banner, and audio replacing program audio in a secondary audio channel or in an audio track. As an example, the total duration of the EAS message may generally be less than two minutes. In the present specification, the open EA message may be referred to as an open EA display, a burned-in message, a burned-in banner message, an EAS message, or the like.

The closed EA message may be a closed message provided while being formatted in a predefined EA related message. The closed EA message may be needed for longevity and detail.

As an example, the closed EA message may be a common alert protocol (CAP) message formatted in a CAP message format or an advanced emergency alert (AEA) message formatted in an AEA message format, which is a newly defined message format (AEA-MF) suitable for a broadcast system. In the present specification, the closed EA message may be referred to as a closed EA display, a CAP message, an AEA message, or the like. Further, in the present specification, an alert message may be used as a concept including the open EA message and the closed EA message.

As an example, the closed EA message may be transmitted while being included in a message table. For example, the AEA message may be transmitted while being included in an advanced emergency alert table (AEAT) table/information. In this case, one message table may include one or more AEA messages.

The EA application (EAA) may be a broadcaster application for providing additional information including emergency information. Further, the rich media file may be a content file that provides the additional information for the emergency alert. As an example, the rich media file may be referenced from the closed EA message, such as the AEA message or may be a resource used by the EAA. Further, EA related programming may be programming (e.g., local news coverage) that provides the viewer with information regarding an ongoing emergency situation.

The EA information needs to be broadcast promptly and provided to a user in the emergency situation. Therefore, the EA information may be transmitted in a different path from normal service data. For example, in the broadcast system, the EA information may be transmitted using a dedicated channel for the EA information or a specific PLP. However, in this case, data/a signal needs to be processed and inserted in the physical layer, which make it difficult to operate the system for the EA information. Therefore, a method for transmitting the EA information using a UDP/IP packet will be described below.

The EA information may be transmitted in IP packets instead of being transmitted as link layer signaling or physical layer channel/data. In particular, in the IP-based broadcast system described above, the IP-based EA information may have an effect of facilitating the system operation. To this end, additional signaling information indicating to which IP packet the EA information is transferred may be configured. As an example, whether the EA information is included may be displayed by using a header part of the packet. Alternatively, the EA information may be transmitted by using IP packets having a well-known address/port. For example, the EA information may be transmitted through IP packets having address 224.0.23.60 and port 4937.

Hereinafter, a flow of the EA information in a broadcast system will be described with reference to FIG. 11. For example, flows of EA related signaling and rich media contents will be described.

FIG. 11 illustrates an EA system according to an embodiment of the present invention. More specifically, FIG. 11 illustrates a method in which a broadcast transmitter transmits EA information and a broadcast receiver obtains the EA information in a next generation broadcast system. In FIG. 11, it is assumed that a thin solid line represents the flow of the EA application, a thin dotted line represents the flow of the CAP message, a bold solid line represents the flow of the AEA message, and a thick dotted line represents the flow of the EAS message.

Referring to FIG. 11, when an emergency occurs in which the emergency information needs to be transmitted through the broadcast network, an EA authority may notify an EA event to a broadcaster by means of the CAP message. However, according to an embodiment, a notification method other than the CAP message may be used.

Then, the broadcaster may receive and process the CAP message. As an example, based on the selection of the broadcaster, any given CAP message may be ignored or provided to the public after being processed within a broadcast program content. As an example, some CAP messages may be discarded by the broadcaster because the CAP messages are not significant enough to interfere with a normal program. Other CAP messages (others) may be discarded because severity is low enough, or an affected area is small or the other CAP messages get out of broadcast coverage.

If the broadcaster decides to distribute contents of a particular incoming CAP message, after editing the contents, the contents may be edited in a new defined message format (e.g., AEA-MF) suitable for the broadcast system. Thereafter, this may be included in a broadcast multiplex (e.g., as the AEA message of the broadcaster of FIG. 11). As an example, a text of the AEA message may be edited in a broadcaster plant before being forwarded to the viewer, for example, to delete only a portion associated only with a first responder or agency. The broadcaster may also have an option to add rich media elements/contents such as graphics or multimedia (e.g., video or audio clips).

The incoming AEA message may also be transferred to an "EA application generator" and the generator may generate a broadcaster application (or contents for the existing application) to be used and distributed by an application runtime environment in a broadcast receiver (e.g., an ATSC 3.0 receiver) in order to provide an interaction experience related to the emergency.

The broadcast receiver may include audio/video rendering and may support a runtime application environment (e.g., an ATSC 3.0 runtime application environment). As illustrated in FIG. 11, depending on formats of URLs referencing the EA related content, the rich media file may provide access to an EA web server through a broadband or provided through a broadcast delivery. That is, the broadcast receiver may acquire the EA related rich media file through a broadband or broadcast path by using the URL.

Application signaling may cause an application resource such as a media file that is usable by an application to be distributed. The URLs in the AEA message referencing rich media (rich media file) may be resolved by either a broadcast or a broadband path, depending on the selection of the broadcaster for file distribution.

Arrows marked with bold dotted lines may indicate EAS information included (burned) in the video or included in audio program contents.

The processing by the broadcaster may be performed by the broadcast transmitter of the broadcaster. A transfer process of the EA information by the broadcast transmitter and the broadcast receiver is again summarized as follows.

First, the broadcast transmitter may receive the EA message such as the CAP message and processes the received EA message. For example, the broadcast transmitter may convert the received CAP message into the AEA message. In this case, the broadcast transmitter may delete/modify information or contents in the CAP message or insert additional information or contents into the AEA message. Thus, the AEA message processed by the broadcast transmitter may include information/content modified or added by the broadcaster. In addition, the broadcast transmitter may burn text (banner text) in the video of a broadcasting service or add secondary audio by using the information or the like in the CAP message. Thus, the broadcast transmitter may generate the EAS message from the CAP message.

The EA information/data thus generated may be processed according to a purpose and the format of each EA, and transmitted to a broadcasting network through the physical layer pipe (PLP) or to a broadband network. For example, one or more generated AEA messages may be transmitted while being included in the AEAT table. In this case, the AEAT table may be transferred while being included in the LLS information.

Thereafter, the broadcast receiver may acquire and parse the AEAT. In an example, the broadcast receiver may autonomously provide the emergency alert to the viewer through a banner, etc., based on the information in the AEA message. In another example, the broadcast receiver may obtain path information for a broadcast service including a burned-in message or secondary audio based on the information in the AEA message and provide video or secondary audio including the burned-in message to the viewer by using the obtained path information. In yet another example, the broadcast receiver may obtain information (e.g., uniform resource identifier (URI) information) regarding the rich media file transferred over broadband or broadcast based on the information in the AEA message and obtain the rich media contents through the broadband or broadcast by using the obtained information and provide the obtained rich media contents to the viewer. In this case, when the rich media file is transmitted through the broadcast, the URI information may be a relative URL indicating a relative path. Alternatively, when the rich media file is transmitted through the broadband, the URI information may be an absolute URL indicating an absolute path.

Hereinafter, an EA signaling method for resolving a broadcaster's request for clearly keeping the screen when the open EA message (burned-in message) is displayed on the screen and using the AEA message instead of the CAP message for the closed EA message (banner message) and the rich media resource will be described.

Further, two types of signaling of the burned-in message such as the EAS message using the EA signaling method are described. A first type is an EAS signaling method with EAS flag signaling as illustrated in FIG. 13 and a second type is an EAS signaling method with delay timer (Delay_Timer) signaling in the AEA message as illustrated in FIG. 14.

FIG. 12 illustrates an LLS table according to another embodiment of the present invention.

As described with reference to FIG. 3, the LLS table may include information according to values and/or a value of an LLS_table_id field, a provider_id field, an LLS_table_version field, and/or an LLS_table_id field. As described above, according to the value of the LLS_table_id field, the corresponding LLS table may include one of SLT information, rating region table (RRT) information, SystemTime information, and EaMessage information (EaMessage) providing information related with the emergency alert. In the present specification, the LLS table may be referred to as LLS information and the LLS_table_id may be referred to as LLS ID information, type ID information, etc.

For example, when the LLS_table_id has a first value (e.g., 0x01), the LLS table ma include SLT information. Alternatively, when the LLS_table_id has a second value (e.g., 0x02), the LLS table ma include RRT information. Alternatively, when the LLS_table_id has a third value (e.g., 0x03), the LLS table ma include SystemTime information. Alternatively, when the LLS_table_id has a fourth value (e.g., 0x04), the LLS table ma include EaMessage information. In the present specification, the EaMessage information may be referred to as EA information, emergency alert information, AEAT information, or the like.

As in the embodiment of FIG. 12, the EA information may be transmitted while being included in an LLS table. In this case, the EA information in the embodiment of FIG. 12 may be the AEAT information including the AEA message which is the AEA message format, unlike the embodiment of FIG. 3, which is the CAP message format. The AEAT information will be described below with reference to FIGS. 16, 18, and 19.

FIG. 13 illustrates a method for signaling an EAS message using EAS flag information according to an embodiment of the present invention. In the embodiment of FIG. 13, the EAS flag information may be included in the EA_message transmitted and included in the LLS table. In the present specification, the EA_message may be referred to as EA information. Further, as described above, the EAS message may be referred to as the open EA message, the burned-in message, an alert message, etc.

Referring to FIG. 13, the EA information may include the EAS flag information and/or the AEA message. For example, the EA information may include a sequence element and the sequence element may include the EAS flag information and the AEA message. Here, the AEA message may be an alert message formatted into an AEA message format (AEA-MF).

Further, the EAS flag information may include a Boolean value indicating whether the EAS message or the burned-in message is on the screen. That is, the EAS flag information may indicate whether the EAS message or the burned-in message is on the screen. Thus, the burned-in information (e.g., EAS flag information) indicating the presence or absence of the open EA message such as the EAS message may be signaled separately from the closed EA message such as the AEA message. In this case, the EAS flag information and the AEA message may be transmitted while being included in the LLS table.

FIG. 14 illustrates an EAS signaling method using delay timer information according to an embodiment of the present invention. In the embodiment of FIG. 14, the delay timer information may be included in the AEA message in the EA_message transmitted and included in the LLS table. As described above, the EA_message may be referred to as EA information, emergency alert information, AEAT information, or the like. Further, the AEA message may be referred to as the alert message, etc.

Referring to FIG. 14, the EA information may include the AEA message format in the AEA-MF and the AEA message may include the delay timer information. Here, the delay timer information may indicate a delay time between first reception of the AEA message or the EA information including the delay timer information and the display on the screen. That is, the delay timer information may indicate a delay time which is a time between the time of first reception of the AEA message or the EA information including the delay timer information and a time when the corresponding message is displayed on the screen. If this value is 0 or missing, the delay timer information may indicate an immediate operation. That is, if the value is 0 or missing, the delay timer information may indicate that when the AEA message or the EA information is received the corresponding message is immediately displayed.

The delay timer information may have an advantage that an additional table is not required. Further, the delay timer information may have an advantage that an additional studio interface or message routing is not required. In addition, the delay timer information may have an advantage that a second message required for counting the burned-in flag information is not required. Further, in the delay timer information, a timing may be related to initial reception so as not to be confused with time zone issues or typos. In addition, when the delay timer information is used, processing of the alert and reception of NRT contents may be immediately started while the display waits for the timer.

Hereinafter, an operation of the broadcast system associated with the delay timer information will be described.

First, the broadcasting transmitter side, a studio operator (or software) may set the duration of the burned-in banner/message. In this case, the delay timer may be automatically set so that a digital banner (or the closed EA message) is displayed just before the burned-in banner (or open EA message) disappears. The continuity helps the user understand the cases as one event instead of two separate events.

The delay parameter (delay timer information) may be added to the alert message (EA message) before transmission. Further, the receiver may decode the alert message and use a delay parameter for two following functions.

First, the broadcast receiver may use the delay parameter to immediately clear a user overlay screen. That is, the delay timer information may be used to clear the screen for a particular service (e.g., an EAS service to provide the EA message such as the burned-in message). Second, the broadcast receiver may use the delay parameter to add the digital banner after the delay period has elapsed.

The digital banner may continue to be displayed until the closed EA message is released or the alert expires. Further, the closed EA message may be recalled until the closed EA message is released or the alert expires.

Hereinafter, the LLS table associated with the EA signaling and the EAS message will be described. Further, the keep clear flag (KCF) information and the AEA message format will be described in detail below.

The KCF information may activate a signaling mechanism to prevent the broadcast contents from blurring due to a display in which graphics are overlaid at the receiver at the discretion of the broadcaster. In the present specification, the KCF information may be referred to as burned-in signaling information.

The AEA message format may be used in place of the CAP message for rich media resources for the closed EA message and the AEA message.

FIG. 15 illustrates an LLS table according to yet another embodiment of the present invention. In contrast to FIGS. 3 and 12, in the embodiment of FIG. 15, the LLS table may include two separate LLS messages, with respect to the EA. For example, the LLS table may include one LLS message for the KCF information and another LLS message for the AEA message format. According to the embodiment, either of the two LLS messages may be absent.

As described in FIGS. 3 and 12, the LLS table/information may include information according to values and/or a value of the LLS_table_id field, the provider_id field, the LLS_table_version field, and/or the LLS_table_id field.

Referring to FIG. 19, according to the value of the LLS_table_id field, the corresponding LLS table may include one of SLT information, rating region table (RRT) information, SystemTime information, AEAT information providing information related to the emergency alert, and the KCF table/information providing information related with the screen clear.

For example, the LLS_table_id has a first value (e.g., 0x01), the LLS table ma include SLT information. Alternatively, when the LLS_table_id has a second value (e.g., 0x02), the LLS table ma include RRT information. Alternatively, when the LLS_table_id has a third value (e.g., 0x03), the LLS table ma include SystemTime information. Alternatively, when the LLS_table_id has a fourth value (e.g., 0x04), the LLS table ma include AEAT information. Alternatively, when the LLS_table_id has a fifth value (e.g., 0x05), the LLS table ma include the KCF information.

In this case, the AEAT information may be EA table/information including one or more AEA messages. The AEA message included in the AEAT information will be described below with reference to FIGS. 16, 18, and 19.

FIG. 16 illustrates AEAT information according to an embodiment of the present invention.

The AEAT information may be one of types of LLS information. The AEAT information may include one or more AEA messages. The AEA message may be formatted as the AEA message format. In the present specification, the AEAT information may be referred to as the EA information, the emergency information, etc. and the AEA message may be referred to as the alert message, etc.

The AEA message format may be for providing the digital message/banner for emergency message transmission. The AEA message format may be in a specific format for delivering all-hazard emergency alerts and general alerts via the broadcast system (e.g., ATSC 3.0 system). Further, the AEA message format may be extended and have a sufficient size to accommodate a content alert message format. In addition, the AEA message format allows a warning message to be propagated to the receiver in a consistent manner. Further, the AEA message format may be XML-based and may be widely used in broadcast, cable, and IPTV environments. In addition, the AEA message format may include a function for multimedia contents which may be transferred by an alert generator or the broadcaster itself.

Referring to FIG. 16, the AEAT table/information may include one or more AEA messages. The AEA message may include one Header element, one or more AEA text elements, and/or zero or more Media elements. Further, the AEA message may optionally include the signature element for additional authentication. As an example, the signature element may include a digitally signed message for additional authentication.

As an example, the AEA message may include an AEA ID attribute (@aeaId) indicating the ID of the AEA message, an audience attribute (@audience) indicating the intended distribution of the AEA message, an AEA type attribute (@aaaType) indicating the category of the AEA message, a reference AEA ID attribute (@referenceAeaId) indicating the referenced ID of the AEA message, a priority attribute (@priority) indicating the priority of the AEA message, or a delay timer attribute (@delayTimer) indicating a delay time between the initial reception of the AEA message and the display on the screen. Hereinafter, each attribute will be described.

The AEA ID attribute (@aeaId) may indicate the ID of the AEA message. A unique number or string for identifying the AEA message may be assigned by the station (sender). A scope of uniqueness needs to be within a given provider ID (Provider_ID). As an example, the ID value of the AEA ID attribute may be mapped to the ID value of a content info element of an S-TSID fragment of SLS information and used for filtering of an AEA resource associated with a desired emergency.

An audience attribute (@audience) may be used for identifying the intended distribution of the AEA message. Such a value may be coded according to Table 1 below.

TABLE 1

| audience | Meaning |
|---|---|
| "public" | For general dissemination to unrestricted audiences. All alerts intended for public consumption must have the value of "public." (required for AEA-MF public dissemination) |
| "restricted" | For dissemination only to an audience with a defined operational requirement. Alerts intended for non-public dissemination may include the value of "restricted?. |
| "private" | For dissemination only to specified addresses (conditional access requirement) |
| other values | Reserved for future use |

Referring to Table 1, when the AEA message is generally disseminated to unlimited audiences, the audience attribute may have a "public" value. In this case, all alerts for intending public consumption need to have a "public value" (required for AEA public distribution).

Alternatively, when there is a defined operational requirement, the audience attribute may have a "restricted" value. In this case, alerts for intending non-public dissemination may have the "restricted" value.

Alternatively, when the AEA message is disseminated only to a specific address (conditional access requirement), the audience attribute may have a "private" value. Alternatively, the audience attribute may have a reserved value for future use.

The AEA type attribute (@aeaType) may be used for identifying category of the AEA message. Such a value may be coded according to Table 2 below.

TABLE 2

| aeaType | Meaning |
|---|---|
| "alert" | Indicates that AEA message is new. (Note, alert messages such as the U.S. required monthly test are considered alert messages, and must contain the value of "alert"). In this case, @referenceAeaId shall not appear. |
| "update" | Indicates that AEA message is not new, but contains updated information from any previous emergency alert message. In this case, @referenceAeaId shall appear. |
| "cancel" | Indicates that AEA message is cancelling any previous emergency alert message, even when the message isn't expired. In this case, @referenceAeaId shall appear. |
| other values | Reserved for future use |

Referring to Table 2, the AEA type attribute may have an "alert" value indicating that the AEA message is new. In this case, the reference AEA ID attribute should not appear.

Alternatively, the AEA type attribute may have an "update" value indicating that the AEA message is not new, but includes information updated from a random previous EA message. In this case, the reference AEA ID attribute should appear.

Alternatively, the AEA type attribute may have a "cancel" value indicating that the AEA message cancels a previous EA message even when the random previous EA message is not randomly terminated. In this case, the reference AEA ID attribute should appear.

Alternatively, the AEA type attribute may have a reserved value for future use.

The reference AEA ID attribute (@referenceAeaId) may be used for identifying the referenced ID of the AEA message. The reference AEA ID attribute may appear when the AEA type attribute is "update" or "cancel". When the AEA type attribute is "alert", the reference AEA ID attribute should not be present.

A priority attribute (@priority) may have an integer value indicating the priority of the alert. Such a value may be coded according to Table 3 below.

TABLE 3

| priority | Meaning |
|---|---|
| 4 | Maximum Priority Urgent or extreme message context A highest level of alert (e.g. the U.S. Emergency Action Notification/EAN) A Canadian "broadcast immediate" requirement in the source alert message. Defined by station operator a time critical alert (e.g. earthquake/EQW or tornado/TOR) |
| 3 | High Priority Defined by station operator for messages of an important or severe context. May also be used for a "broadcast immediate" message. Overrides any previous messages. |
| 2 | Moderate Priority Defined by station operator for messages of a moderate but actionable priority |
| 1 | Low Priority Defined by station operator for messages of an informative nature, or of minor and non-actionable status (e.g. weather watches). |
| 0 | Test Message Periodic or occasional test or administrative signals. This should not interrupt the user from other interactive functions. |
| other values | Reserved for future use |

Referring to Table 3, the priority attribute may have any one of a first value (e.g., 4) indicating a maximum priority, a second value (e.g., 3) indicating a high priority, a third value (e.g., 2) indicating a moderate Priority, a fourth value (e.g., 1) indicating a low Priority, and a fifth value (e.g., 0)

indicating a test message. Alternatively, the priority attribute may have a reserved value for future use.

In this case, the maximum priority may have an urgent or extreme message context. The maximum priority may provide a highest level of alert (for example, US emergency action notification/EAN). Further, the maximum priority may be defined by a broadcaster operator and may provide a time critical alert (for example, earthquake/EQW or tornado/TOR).

Alternatively, the high priority may be defined by the broadcaster operator and may provide a message of an important or critical context. Further, the high priority may be used for an "immediate broadcast" message. The high priority may disregard the previous message.

Alternatively, a normal priority may be defined by the broadcaster operator and may provide a message of a normal but practical priority.

Alternatively, a low priority may be defined by the broadcaster operator and may provide a message of an informative characteristic or a message of a monitor and impractical message (for example, weather watches).

Alternatively, the test message represents a periodic or occasional test or management signal. The test message should not interfere with a user in another interactive function.

The priority attribute may be used to determine which message the broadcast receiver should prefer to display on the screen when the AEAT information includes a plurality of AEA messages. For example, when the AEAT information transmits the plurality of AEA messages, if there is no priority information for each AEA message, the receiver may not determine from which message to display on the screen. In this case, the receiver may perform a scheme of displaying the AEA message in the form of the banner on the screen in the order of the AEAT information regardless of the importance of the AEA message or the like. However, when the AEAT information includes the priority information, the broadcast receiver may provide the AEA message to the user in a desired order considering the priority of the AEA message.

The delay timer attribute may indicate a delay time between a effective time of the AEA message and a time when the receiver overlays AEA related graphics. The delay time may be, for example, a time for permitting a time when the open EA message is to be viewed. The delay time may be expressed as a format of "mm:ss" and a maximum delay time may be "60:00", that is, 1 hour.

When there is no delay timer attribute, the receiver may immediately overlay the AEA related graphics. The delay timer information may be used together with the KCF information to be described later or may be used in place of the KCF information.

When both the KCF information and the delay timer attribute are present, only one indicates that the broadcaster wishes not to display a graphic overlay generated by the receiver on the screen, an action of the receiver may be determined by receiver implementation. However, when both fields indicate that there the graphic overlay need not be avoided, it may be reasonable to expect that the receiver will only render the graphic overlay.

Hereinafter, a header element, an AEA text element, and a media element of the AEA message will be described.

The header element of the AEA message may be a container for a basic alert envelope. The header element may include relevant envelope information for the alert including a type of alert, a when the alert expires, and a location of a target alert area.

As an example, the header element may include at least one of an effective time attribute (@effective) indicating an effective time of the AEA message, an expiration time attribute (@expires) indicating an expiration time of the AEA message, an event code element (EventCode) which is a code for identifying an event type of the AEA message, and a location element (Location) which is a geocode indicating an affected area affected by the AEA message. Hereinafter, each attribute and a sub attribute will be described.

The effective time attribute (@effective) may be a date and a time indicating the effective time of the AEA message. The date and time may be represented by a DateTime data type format (e.g., "2002-05-24T16: 49: 00-07: 00" for 24 May 2002 at 16:49 PDT).

The expiration time attribute (@expires) may be a date and a time indicating the effective time of the AEA message. The date and time may be represented by a DateTime data type format (e.g., "2002-05-24T16: 49: 00-07: 00" for 24 May 2002 at 16:49 PDT).

The event code element (EventCode) may be a code for identifying the event type of the AEA message. A string (which may represent a number) representing the value itself (e.g., in the United States, value="EVI") may be used to indicate an evacuation alert. The values may vary from country to country. There may be only one event code element per message.

As an example, the event code element may include a type attribute (@type). The type attribute may be a national-assigned string (e.g., in the United States, "SAME" indicates standard FCC Part 11 EAS coding) for specifying a domain of the event code. A value of the type attribute which is acronyms needs to be represented by a capital without a period.

The location element may be a geographically-based code for describing a message target area. That is, the location element may describe a message target with the geographically-based code.

As an example, the location element may include a type attribute (@type). The type attribute may represent the national-assigned string for specifying the domain of the location code. The value may be a character string (may express a number) representing the value itself (e.g., in the United States, type attribute="FIPS" and location element="12345" or location element="12345678910" by using an extended FIPS value). The type attribute and the value of the location element may vary from country to country. The value of the type attribute which is acronyms needs to be represented by a capital (e.g., SAME, FIPS, or ZIP) without the period.

The AEA text element of the AEA message may include a specific text of an emergency notification. As an example, the AEA text element needs to contain exactly language attribute (@lang). In the case of multiple language information, the element needs to request existence of multiple AEA text elements.

The language attribute may be a code representing a language of each element of the AEA message. Such a code value may be an ISO code/natural language identifier. There should be no implicit default and there must be exactly one language attribute.

The media element of the AEA message may include a component part of the multimedia resource. The media element may reference an additional file with supplemental information associated with the AEA text element. For example, an image file, an audio file, or multiple instances may occur in an AEA block.

As an example, the media element may include at least one of the language attribute (@lang), a media URI attribute (@mediaUri), a media description element (MediaDesc), and a DerefUri element.

The language attribute (@lang) may be a code representing the language of each media element. The language attribute may identify each language for each media resource. When different language instances of the same multimedia are transmitted, the language attribute for each media element may be used in order to instruct a recipient.

The media URI attribute (@mediaUri) may indicate the ID of a media file. The media URI attribute may be a full URI (in general, URL) which may be used to search a resource through the Internet or a relative URI naming contents the corresponding element when there is the derefUri element. When the rich media resource is delivered over the broadband, the URI element of the resource element may be a URL that references the file on a remote server. When the rich media resource is delivered through the broadcast, the URI element of the resource element should begin with http://localhost/. The relative URL should match the content-location attribute corresponding to the file element in an EFDT instance in an LCT channel that delivers an entity header of the file or the file.

The media description element (MediaDesc) may describe contents of the media resource. The media description element may include a text for describing contents of the media file and a type of medial file. As an example, the media description element may include a plain text for describing the contents and the type. The description may indicate media information. For example, the description may indicate a media type such as a video, a photograph, a PDF, or the like.

As an example, the media description element may include the language attribute (@lang). The language attribute may be a code representing the language of each media description element. Such a code value may be the ISO code/natural language identifier. There should be no implicit default and there must be exactly one language attribute.

As an example, the language of the media description element may be the same as the language indicated by the language attribute of the media element. In this case, the language attribute of the media description element may be omitted.

The DerefUri element may be a mimetype data content of the media file (media resource file). The DerefUri element may be used in conjunction with, or in place of, a media URI element/attribute in a message sent over a data link (e.g., an ATSC 3.0 data link) that is not resource-searchable via the URI.

FIG. 17 illustrates KCF information according to an embodiment of the present invention.

As described above, the KCF information may activate a signaling mechanism for signaling to the receiver so as to prevent broadcast contents from blurring with a display graphic overlay at the discretion of the broadcaster (e.g., used when the open EA message is displayed on the screen). In other words, the KCF information may instruct the receiver to prevent some parts (e.g., important text/visual information, including visually embedded EA-related information in the video) of a video image at the receiver from blurring.

In general, when the KCF information is set to "true", the KCF information may mean that the broadcaster is sending arbitrary information on the screen. When the KCF information does not exist, the KCF information should be interpreted as "False". When both the KCF information and the delay timer attribute are present, only one indicates that the broadcaster wishes not to display a graphic overlay generated by the broadcaster on the screen, the action of the receiver may be determined by receiver implementation. However, if both fields indicate that there is no need to eliminate the graphic overlay, it may be reasonable to expect that the receiver will only render the graphic overlay.

Referring to FIG. 17, the KCF information/table may include at least one of a BSID attribute (@bsid), a flag attribute (@flag), a service ID attribute (@serviceId), a service ID range attribute (@serviceIdRange), and a version attribute (@version).

The KCF information may be a root element of a KCF LLS table fragment. That is, the KCF information may be the root element of the KCF. The KCF information may include broadcaster information and service information for on-screen information (e.g., on-screen text/visual information) that includes EA related information. Further, the KCF information may carry information on services related to keep screen clear status corresponding to on-screen critical information. Therefore, in the present specification, the KCF information may be referred to as KeepScreenClear information or screen clear information or the like.

A BSID attribute may indicate an identifier of an entire broadcast stream. As an example, the BSID attribute may be a 16-bit integer indicating the BSID of the broadcast stream associated with the value of the service ID attribute indicated in the corresponding KCF information. As an example, the value of the BSID attribute may be a value that is unique at a local level. A management or regulatory authority may perform such a role.

The flag attribute may indicate a status of the KCF information. As an example, the flag attribute may be a Bloolean flag of the KCF information. Specifically, the flag attribute may indicate the status of the KCF information for the identified service for the identified broadcast stream. If the value of the flag attribute is true, the flag attribute may mean that the broadcaster would like to suppress the receiver-generated graphic overlay. If the KCF information does not exist, a default value of the flag attribute may be false.

The version attribute may indicate the version of the KCF information. As an example, each time any data in the KCF information is changed, the value of the version information may be incremented by one.

The version information may also be provided so that the viewer may release the given KCF information and resume use of the display graphic overlay if necessary. The version information allows the receiver to distinguish the KCF information that is released by the viewer and new KCF information from each other. For example, if a reason for maintaining the screen clearing is changed, a version number will be increased, so that the receiver may distinguish one KCF information from another KCF information, and the receiver may release the given KCF information and receive subsequent different KCF information. The extent of uniqueness of the version attribute can be determined by the broadcaster. In the present specification, the version information may be referred to as a KCF version or KCF version information.

The service ID attribute may represent an ID list of one or more services within the range of the broadcast stream to which the KCF information is applied. If the service ID attribute does not exist, the KCF information may be applied to all services in the broadcast stream identified by the BSID attribute. When a plurality of services is included, IDs of the services may be divided into spaces.

The service ID range attribute may indicate a range of the service ID attribute to which the KCF information is applied. As an example, the service ID range attribute may be an 8-bit value for indicating the range of the service ID attribute to which the KCF information is applied. If the service ID attribute exists and the service ID range attribute does not exist, the service ID range attribute needs to be set to 0.

As in the embodiment of FIG. 17, when the broadcast transmitter transmits information related to the screen clear status keeping in the EA message but transmits the information related with the screen clear status keeping using the message/information separate from the EA message, it is possible to provide the instruction for keeping the screen clear status for various services to the broadcast receiver. In other words, the broadcast transmitter may provide the broadcast receiver with the instruction for the screen clear status keeping for other services including important on-screen information in addition to the EAS service.

FIG. 18 illustrates AEAT information according to another embodiment of the present invention. In FIG. 18, a description duplicated with FIG. 16 will be omitted.

Referring to FIG. 18, the AEAT table/information may include one or more AEA messages. In this case, the AEA message may include the AEA ID attribute (@aeaId), an issuer attribute (@Issuer), an audience attribute (@audience), an AEA type attribute (@aeaType), a reference AEA ID attribute (@referenceAeaId), a priority attribute (@priority), a preferred tuning element (PreferredTuning), a header element, a AEA text (AeaText) element, and/or a media element. Further, the AEA message may optionally include a signature element.

Unlike the embodiment of FIG. 16, in the embodiment of FIG. 18, the AEA message may not include the delay timer attribute. As described above, a purpose of the delay timer attribute is to prevent covering the banner burned in the receiver-generated banner. Although a crawl (e.g., burned banner) in which an EA equipment of the broadcaster is burned may be generated, it is not known how long the CG will last to produce the crawl or how fast the CG is reproduced, and as a result, it is very difficult to accurately know when a burned crawl text ends. Further, the delay timer requires a reference time when a delay starts. For example, a time when the AEA message is first received may become the reference time. Under such a condition, the delay timer attribute may have a problem in that the delay timer attribute delays a digital banner more than necessary. Further, the delay timer attribute may have a problem in that the delay timer attribute overlaps with the KCF information (or OnScreenNotification: OCN). In order to such a problem, as described in the embodiment of FIG. 18, the AEA message may not include the delay timer attribute.

Meanwhile, a receiver capable of rendering an EA-related digital banner and a rich media content may render a bug (e.g., icon) that induce a viewer to view digital banners and/or other rich media. Such a bug may be displayed before rendering the digital banner and/or other rich media. Further, the bug may be displayed at a position where there is no possibility of covering the burned banner. Therefore, it may be important to identify a safe area for representing the bug. For example, the bug may not be displayed for a specific type of alert such as "maximum priority" (priority=4) including a 3-second earthquake alert. In this case, the receiver may render the EA information as soon as possible.

Further, unlike the embodiment of FIG. 16, in the embodiment of FIG. 18, the AEA message may further include the issuer attribute (@Issuer) and/or the preferred tuning element (PreferredTuning). Hereinafter, each will be described.

The issuer attribute may indicate an identifier of a broadcast station that forwards or originates the AEA message.

The preferred tuning element (PreferredTuning) as a choice for continuing live information may first provide an identification of an A/V service to be presented to the user. Specifically, the preferred tuning element as a choice for tuning emergency-related information (e.g., ongoing new coverage) may provide an identification of a broadcast delivered A/V service which may be provided to the user. Such a preferred tuning element may include information (e.g., emergency-related live A/V service information) regarding a live A/V service delivered through a broadcast stream. In the present specification, the preferred tuning element may be referred to as a live media element (LiveMedia).

As an example, the preferred tuning element may include at least one of the BSID attribute (@bsid), the service ID attribute (@serviceId), a major channel number attribute (@majorChannelNo), and a minor channel number attribute (@minorChannelNo). Hereinafter, each attribute will be described.

The BSID attribute (@bsid) may indicate the ID of the entire broadcast stream including a preferred tuning service. Here, the preferred tuning service as an A/V service identified by the preferred tuning element may be an A/V service for providing the live information (or live media). For example, the preferred tuning service may be an emergency-related live A/V service. The BSID attribute may be used for indicating the ID of the broadcast stream including the emergency-related live A/V service.

The service ID attribute (@serviceId) may uniquely identify the preferred tuning service. The service ID attribute may be an integer that identifies the preferred tuning service within the scope of the broadcast area. As an example, the service ID attribute (@serviceId) may be a 16-bit integer for uniquely identifying the preferred tuning service. The service ID attribute may be used for uniquely identifying the emergency-related live A/V service.

The major channel number attribute may indicate a major channel number of the preferred tuning service. As an example, the major channel number attribute may be an integer in the range of 1 to 999 indicating the major channel number of the preferred tuning service.

The minor channel number attribute (@minorChannelNo) may indicate a minor channel number of the preferred tuning service. As an example, the minor channel number attribute may be an integer in the range of 1 to 999 indicating the minor channel number of the preferred tuning service. Hereinafter, a method in which the broadcast system signals the live media service by using the preferred tuning element will be described as an example.

For example, when there is the emergency-related live media requiring preferred tuning, the broadcast transmitter may transmit the AEA message including the preferred tuning element including the service ID attribute and the BSID attribute for identifying the live media and the broadcast stream including the live media. In this case, the AEA message may be included in the AEAT information and the AEAT information may be transmitted while being included in the LLS table.

In this case, the broadcast receiver may acquire the LLS table including the AEAT information from the broadcast stream and parse the acquired LLS table and acquire the AEA message including the live media element. Thereafter, in this case, the broadcast receiver may identify a service in which the liver media is usable and the broadcast stream including the service by using the BSID attribute and the service ID attribute of the preferred tuning element and render the live media. Therefore, the broadcast receiving apparatus may provide the emergency-related live A/V service to the user.

Hereinafter, a method for associating the digital banner with an audio file and a method for associating an EA media file with another file will be described.

When the preferred digital banner and the audio file are associated with each other, the broadcast station needs to have an audio copy of the available burned banner. Further, the station may perform the same operation as the digital. It is already defined that the audio file such as NRT is sent. It is necessary to identify which audio file represents the digital banner.

When the EA media file and another file are associated with each other, there may be a CC track connected with an AEA NRT video. In this case, the CC file needs to be associated with the video.

FIG. 19 illustrates AEAT information according to yet another embodiment of the present invention. In FIG. 19, a description duplicated with the contents described in FIGS. 16 and 18 will be omitted.

Referring to FIG. 19, the AEAT table/information may include one or more AEA messages. In this case, the AEA message may include the AEA ID attribute (@aeaId), the issuer attribute (@Issuer), the audience attribute (@audience), the AEA type attribute (@aeaType), the reference AEA ID attribute (@referenceAeaId), the priority attribute (@priority), the header element, the AEA text (AeaText) element, the live media element (LiveMedia), and/or the media element. Further, the AEA message may optionally include the signature element for additional authentication. As an example, the signature element may include a digitally signed message for additional authentication.

As compared with the embodiment of FIG. 18, in the embodiment of FIG. 19, the AEA message may include the live media element (LiveMedia) instead of the preferred tuning element (PreferredTuning). As described above, the live media element may be referred to as the preferred tuning element.

The live media element (LiveMedia) may include the information regarding the emergency-related live A/V service transmitted through the broadcast stream.

As an example, the live media element may include the BSID attribute (@BSID), the service ID attribute (@serviceId), and/or a service name element (ServiceName). Hereinafter, each element and attribute will be described.

The BSID attribute (@bsid) may be used for indicating the ID of the broadcast stream including the emergency-related live A/V service.

The service ID attribute (@serviceId) may uniquely identify the emergency-related live A/V service. As an example, the service ID attribute may be an integer for uniquely identifying the emergency-related live A/V service.

The service name element may indicate a name for a service usable by the live media. The service name element may be a user-friendly name the service usable by the live media. When an option for tuning the live media is presented, the broadcast receiver may present the service name (e.g., "WXYZ Channel 5") to the viewer.

As an example, the service name element may include the language attribute (@lang). The language attribute (@lang) may indicate the language of the text described in the service name element. That is, the language attribute may indicate the language of the service name element. The language attribute may be used to identify the language of each service name element of the live media stream. Hereinafter, a method in which the broadcast system signals the emergency-related live media service by using the live media element will be described as an example.

For example, in order to provide the emergency-related live media, the broadcast transmitter may transmit the AEA message including the live media element including the service ID attribute and the BSID attribute for identifying the live media and the broadcast stream including the live media. In this case, the AEA message may be included in the AEAT information and the AEAT information may be transmitted while being included in the LLS table.

In this case, the broadcast receiver may acquire the LLS table including the AEAT information from the broadcast stream and parse the acquired LLS table and acquire the AEA message including the live media element. Thereafter, the broadcast receiver may identify a service usable by the live media and the broadcast stream including the service by using the BSID attribute and the service ID attribute of the live media element and render the live media. Further, when the option for tuning the live media is presented, the broadcast receiver may present the service name to the viewer by using the service name element of the live media element. Therefore, the broadcast receiving apparatus may provide the emergency-related live A/V service and the information regarding the emergency-related live A/V service to the user.

Further, in the embodiment of FIG. 19, the media element (Media) may include at least one of the language attribute (@lang), a banner audio flag attribute (@bannerAudioFlag), the media description element (@mediaDesc), a URL attribute (@url), a content type attribute (@contentType), a content length attribute (@contentLength), and a media association attribute (@mediaAssoc).

As compared with the embodiments of FIGS. 16 and 18, in the embodiment of FIG. 19, the media element may further include the banner audio flag attribute and/or the media association attribute. Further, the media element may further include the content type attribute and/or the content length attribute. In addition, the media element may include the URL attribute instead of the URI attribute. Hereinafter, each sub element and attribute of the media element will be described.

As described above in FIGS. 16 and 18, the media element (Media) may comprise a component part of the multimedia resource. The language attribute (@lang) may indicate the language of each media element. The media description attribute (@mediaDesc) may be a text for describing the contents of the media file. The URL attribute (@mediaUri) may represent the ID of the media file.

The banner audio flag attribute (@bannerAudioFlag) may indicate whether the media resource is an audio representation of the banner text. As an example, the banner audio flag attribute may be a flag indicating whether the media resource is the audio representation of the banner text. As an example, the banner audio flag attribute may be a flag indicating whether the media resource is the audio representation of the banner text. When the attribute is present, the media resource needs to be used as normal media files.

The content type attribute (@contentType) may indicate a MIME type of a media content referenced by the URL attribute. The content length attribute (@contentLength) may indicate a size of the media content referenced by the URL attribute.

The media association attribute (@mediaAssoc) may indicate the URI of another media element associated with the attribute. The media association attribute as an optional attribute may match the URI attribute of another rich media resource with which the media resource is associated. Examples thereof may include a closed caption associated with the video. Specifically, when the media resource for a first media element is the video and there is a subtitle associated with the video, the media association attribute of the first media element may provide URI information of a subtitle associated with the video.

When the media element includes the media association attribute, the broadcast receiver may rapidly acquire a second rich media resource associated with a first rich media resource identified by the media element by using a URL value of the media association attribute. For example, the broadcast receiver may immediately acquire the second rich media resource associated with the first rich media resource without acquiring signaling information (e.g., AEAT information, SLT information, etc.) for signaling the second rich media resource by using the URL value of the media association attribute. In this way, the broadcast receiver may quickly provide the first rich media resource and the associated second rich media resource together to the user. For example, the broadcast receiver may display the EA related video and the subtitle associated with the video together to the user. In this case, for example, a viewer using a language other than the language of the audio provided through the EA-related video or a hearing-impaired person who can not hear the voice, has an advantage that the EA-related information may be directly checked through the subtitle associated with the video.

FIG. 20 illustrates a configuration of a broadcast signal transmitter/receiver according to an embodiment of the present invention. In the present specification, a broadcast signal transmitter may be referred to as a broadcast transmitter, a transmitter, etc., and a broadcast signal receiver may be referred to as a broadcast receiver, a receiver, etc.

In FIG. 20, a broadcast signal receiver/transmitter 2000 may include a communication unit 2010 a processor 2020, and a memory 2030.

The communication unit 2010 is connected with the processor 2020 to transmit/receive a broadcast signal. The communication unit 2010 may transmit a signal by up-converting data received from the processor 2020 to a transmission/reception band. The communication unit 2010 may down-convert the received data and deliver the down-converted data to the processor 2020.

The processor 2020 is connected with the communication unit 2010 to implement a broadcast signal processing technology according to an ATSC 3.0 system. For example, the processor 2020 may perform IP processing, link layer processing, and/or physical layer processing. The processor 2020 may be configured to perform operations in accordance with various embodiments of the present invention in accordance with the aforementioned drawings and descriptions. Further, at least one of a module that implements the operation of the broadcast signal transmitter/receiver 2000 according to various embodiments of the present invention may be stored in the memory 2030 and executed by the processor 2020.

The 2030 is connected with the processor 2020 to store various pieces of information for driving the processor 2020. The memory 2030 is included in the processor 2020 or installed outside the processor 2020 to be connected with the processor 2020 by a known means. A detailed configuration of the broadcast signal transmitter/receiver 2000 may be implemented such that matters described in various embodiments of the present invention described above are applied independently or two or more embodiments are simultaneously applied.

FIG. 21 illustrates a broadcast signal transmitting method according to an embodiment of the present invention.

The broadcast transmitter may generate low level signaling (LLS) information (S21010). An LLS information/table as a signaling transmitted at an IP level is described in FIGS. 3, 12, and 15. The LLS information may also be referred to as the LLS table.

The LLS information may include LLS ID information that identifies a type of LLS information. In this case, the LLS information may include emergency alert (EA) information according to type ID information. For example, when the type ID information has a first value, the LLS information may include emergency alert information. The emergency alert information as an information/table for providing EA-related information is described with reference to FIGS. 16, 18, and 19. The type ID information may also be referred to as LLS table ID information. Further, the emergency alert information may be referred to as AEAT information, EA information, EaMessage information, and the like.

The emergency alert information may include at least one alert message. The alert message may be referred to as an EA message, an AEA message, and the like and may be described in FIGS. 16, 18, 19, and the like.

As an example, each alert message may include priority information indicating the priority of the alert. The priority information may be referred to as a priority attribute and may be described in FIG. 16 and the like.

As an example, each alert message may include at least one piece of media information. In this case, media information may include media association information indicating a URI of other media information associated with the media information. This is described in FIG. 19. Further, the media information may further include URI information for identifying the media file and media description information for describing contents of the media file. This is described in FIGS. 16, 18, and 19.

As an example, each alert message may include at least one piece of media information. In this case, the live media information may include BSID information for identifying the broadcast stream including the emergency-related A/V service and service ID information for identifying the emergency-related A/V service. Further, the live media information may further include service name information and the service name information includes language information indicating the language of the text described in the service name information. The live media information may be referred to preferred tuning information/element and the live media information and sub information (sub element and attribute) of the live media information are described in FIGS. 18 and 19.

As an example, each alert message may include header information. In this case, the header information includes effective time information for indicating a effective time of the alert message, expiration time information for indicating an expiration time of the alert message, event type information for identifying an event type of the alert message, event description information for providing text description of the alert message, or location information for indicating a target area of the alert message.

The broadcast signal transmitter may process the LLS information into IP packets (S21020). In this case, in processing the LLS information into IP packets, the LLS information may be processed into IP packets having a well-known IP address. For example, the LLS information may be processed into IP packets with an address of 224.0.23.60. This is described above with reference to FIG. 3.

The broadcast signal transmitter performs link layer processing of the IP packets to generate link layer packets (S21030). According to an embodiment, the broadcast signal transmitter may process IP packets including LLS information into one link layer packet. Such link layer processing is described above with reference to FIGS. 6 and 7.

The broadcast signal transmitter performs physical layer processing of the link layer packet to generate the broadcast signal (S21040). The generated broadcast signal may be transmitted through the broadcast network. This is described above with reference to FIGS. 8 to 10.

Meanwhile, the broadcast signal receiver may perform a reverse operation of the broadcast signal transmitter. Hereinafter, a broadcast signal receiving method by the broadcast signal receiver will be described.

First, the broadcast signal receiver may receive the broadcast signal. In this case, the broadcast signal may include the LLS information. In this case, the broadcast signal receiver may acquire the LLS information from the broadcast signal. Thereafter, the broadcast signal receiver may parse the LLS information and control the operation of the broadcast signal receiver based on information included in the LLS information.

When a method for acquiring the LLS information from the broadcast signal by the broadcast signal receiver is described as an example, first, the broadcast signal receiver performs physical layer processing of a broadcast signal (or a signal frame of the broadcast signal) to output the link layer packets and performs link layer processing of the link layer packets to output the IP packets. In this case, the broadcast signal receiver may filter a specific IP packet stream. For example, the broadcast signal receiver may optionally output only the IP packets having the well-known IP address. In this case, the IP packets may include the LLS information. The broadcast signal receiver processes the IP packets to acquire the LLS information.

The broadcast signal receiver may parse the acquired LLS information and control the operation of the broadcast signal receiver based on the parsed LLS information. For example, the broadcast signal receiver parses the LLS information to acquire the emergency alert information. The acquired emergency alert information may be described below in FIG. 21, etc.

Each of the steps described in the above embodiments may be performed by hardware/processors. Each module/block/unit described in the above embodiments may operate as the hardware/processor. Further, the methods proposed by the present invention may be executed as the codes. The code may be written to a storage medium readable by the processor, and thus readable by a processor provided by the apparatus.

Although the drawings have been described for the sake of convenience of explanation, it is also possible to design a new embodiment to be implemented by merging the embodiments described in each drawing. Configurations and methods of the described embodiments may not be limitedly applied to the apparatus and the method according to the present invention, but all or some of the respective embodiments may be selectively combined and configured so as to be variously modified.

Meanwhile, the method proposed by the present invention may be implemented as a processor readable code in a processor readable recording medium provided in a network device. The processor readable recording medium includes all kinds of recording devices storing data which may be deciphered by a processor. Examples of the processor readable recording medium include a ROM, a RAM, a CD-ROM, a magnetic tape, a floppy disk, an optical data storage device, and the like and further include a device implemented as a type of a carrier wave such as transmission through the Internet. Further, the processor readable recording media may be stored and executed as codes which may be distributed in the computer system connected through a network and read by the processor in a distribution method.

Further, although the embodiments of the present invention have been illustrated and described above, the present invention is not limited to the aforementioned specific embodiments, various modifications may be made by a person with ordinary skill in the technical field to which the present invention pertains without departing from the subject matters of the present invention that are claimed in the claims, and these modifications should not be appreciated individually from the technical spirit or prospect of the present invention.

It will be understood by those skilled in the art that various changes and modifications can be made therein without departing from the spirit or scope of the invention. Accordingly, it is intended that the present invention cover the modifications and variations of the present invention provided they come within the scope of the appended claims and their equivalents.

In the present specification, all apparatus and method inventions are herein mentioned and descriptions of both apparatus and method inventions can be supplemented and applied to each other.

MODE FOR INVENTION

Various embodiments are described in a best mode for carrying out the present invention.

INDUSTRIAL APPLICABILITY

The present invention is used in a series of broadcast signal transmission/reception fields.

It will be apparent to those skilled in the art that various changes and modifications can be made therein without departing from the spirit or scope of the invention. Accordingly, it is intended that the present invention cover the modifications and variations of the present invention provided they come within the scope of the appended claims and their equivalents.

The invention claimed is:

1. A broadcast signal transmitting method comprising:
   generating low level signaling (LLS) information, wherein the LLS information includes table ID information for identifying a type of the LLS information;
   processing the LLS information into IP packets;
   generating link layer packets by link layer processing the IP packets; and
   generating a broadcast signal by physical layer processing the link layer packets,
   wherein the LLS information further includes an emergency alert table (EAT),
   wherein the EAT includes at least one emergency alert message,
   wherein the at least one emergency alert message includes message identification information for identifying the at least one emergency alert message, priority information for indicating a priority of an alert, a text of an emergency notification, Uniform Resource Locator (URL) information for identifying a media file that provides additional information related to the text of the emergency notification, Uniform Resource Identifier (URI) information of another media file associated with the media file, and at least one live media information, and wherein the at least one live media information includes broadcast stream identifier (BSID) information for identifying a broadcast stream including an emergency-related live audio/video (A/V) service and service ID information for identifying the emergency-related live A/V service.

2. The broadcast signal transmitting method of claim 1, wherein the media file is one of an image file or an audio file related to the text of the emergency notification.

3. The broadcast signal transmitting method of claim 1, wherein the at least one emergency alert message further includes media description information for describing a content of the media file.

4. The broadcast signal transmitting method of claim 1, wherein the at least one live media information further includes service name information and wherein the service name information includes language information for indicating a language of a text described in the service name information.

5. The broadcast signal transmitting method of claim 1, wherein the at least one emergency alert message further includes header information, and
wherein the header information includes effective time information for indicating an effective time of the at least one emergency alert message, expiration time information for indicating an expiration time of the at least one emergency alert message, event code information for identifying an event type of the at least one emergency alert message, event description information for providing text description of the at least one emergency alert message, or location information for indicating a target area of the at least one emergency alert message.

6. A broadcast signal transmitter comprising:
a communication unit configured to transmit a broadcast signal;
a memory configured to store data; and
a processor configured to control the communication unit and the memory,
wherein the broadcast signal transmitter is configured to generate low level signaling (LLS) information, wherein the LLS information includes table ID information for identifying a type of the LLS information,
process the LLS information into IP packets,
generate link layer packets by link layer processing the IP packets, and
generate the broadcast signal by physical layer processing the link layer packets, and
wherein the LLS information further includes an emergency alert table (EAT),
wherein the EAT includes at least one emergency alert message,
wherein the at least one emergency alert message includes message identification information for identifying the at least one emergency alert message, priority information for indicating a priority of an alert, a text of an emergency notification, Uniform Resource Locator (URL) information for identifying a media file that provides additional information related to the text of the emergency notification, Uniform Resource Identifier (URI) information of another media file associated with the media file, and at least one live media information, and wherein the at least one live media information includes broadcast stream identifier (BSID) information for identifying a broadcast stream including an emergency-related live A/V service and service ID information for identifying the emergency-related live A/V service.

7. The broadcast signal transmitter of claim 6, wherein the media file is one of an image file or an audio file related to the text of the emergency notification.

8. The broadcast signal transmitter of claim 6, wherein the at least one emergency alert message further includes media description information for describing a content of the media file.

9. The broadcast signal transmitter of claim 6, wherein the at least one live media information further includes service name information and wherein the service name information includes language information for indicating a language of a text described in the service name information.

10. The broadcast signal transmitter of claim 6, wherein the at least one emergency alert message includes header information, and
wherein the header information includes effective time information for indicating an effective time of the at least one emergency alert message, expiration time information for indicating an expiration time of the at least one emergency alert message, event code information for identifying an event type of the at least one emergency alert message, event description information for providing text description of the at least one emergency alert message, or location information for indicating a target area of the at least one emergency alert message.

11. A broadcast signal receiver comprising:
a tuner configured to tune a broadcast signal; and
a signaling parser configured to parse signaling information comprising low level signaling (LLS) information,
wherein the LLS information includes table ID information for identifying a type of the LLS information,
wherein the LLS information further includes an emergency alert table (EAT),
wherein the EAT includes at least one emergency alert message,
wherein the at least one emergency alert message includes message identification information for identifying the at least one emergency alert message, priority information for indicating a priority of an alert, a text of an emergency notification, Uniform Resource Locator (URL) information for identifying a media file that provides additional information related to the text of the emergency notification, Uniform Resource Identifier (URI) information of another media file associated with the media file, and at least one live media information, and wherein the at least one live media information includes broadcast stream identifier (BSID) information for identifying a broadcast stream including an emergency-related live A/V service and service ID information for identifying the emergency-related live A/V service.

12. The broadcast signal receiver of claim 11, wherein the media file is one of an image file or an audio file related to the text of the emergency notification.

* * * * *